US012782542B2

(12) United States Patent

Park et al.

(10) Patent No.: US 12,782,542 B2

(45) Date of Patent: Nov. 3, 2026

(54) METHOD AND SYSTEM FOR TRACKING MULTIPLE TARGETS USING ACTIVE ELECTRONICALLY SCANNED ARRAY RADAR

(71) Applicant: AGENCY FOR DEFENSE DEVELOPMENT, Daejeon (KR)

(72) Inventors: Yeonhee Park, Daejeon (KR); Ji Eun Roh, Daejeon (KR); Ji Hwan Yoon, Daejeon (KR); Wonjin Lee, Daejeon (KR); Jinju Won, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 208 days.

(21) Appl. No.: 18/784,946

(22) Filed: Jul. 26, 2024

(65) Prior Publication Data

US 2025/0035769 A1 Jan. 30, 2025

(30) Foreign Application Priority Data

Jul. 28, 2023 (KR) ........................ 10-2023-0098890

(51) Int. Cl.

*G01S 13/72* (2006.01)
*G01S 13/68* (2006.01)
*G01S 13/02* (2006.01)

(52) U.S. Cl.

CPC ............ *G01S 13/726* (2013.01); *G01S 13/68* (2013.01); *G01S 2013/0254* (2013.01)

(58) Field of Classification Search

CPC ............................................... G01S 2013/0254

See application file for complete search history.

(56) References Cited

FOREIGN PATENT DOCUMENTS

| | | | | |
|---|---|---|---|---|
| KR | 101235149 | | 2/2013 | |
| KR | 20150124874 | | 11/2015 | |
| KR | 101628154 | | 6/2016 | |
| KR | 102093919 | | 3/2020 | |
| KR | 20210096862 | | 8/2021 | |
| KR | 20210096862 A | * | 8/2021 | ........... G01S 13/726 |

OTHER PUBLICATIONS

Machine translation of KR-20210096862-A (Year: 2021).*
Machine translation of fig. 1 of KR-20210096862 A (Year: 2021).*
Rogoway, T. “We talk F-15EX’s new radar with the woman who runs the program behind it.” (Apr. 19, 2021). The TWZ Newsletter (Year: 2021).*
Park, Y. et al., “Adaptive Radar Task Scheduling Algorithm Considering the Target Priority,” KSAS 2017 Fall Conference, Nov. 2017, pp. 1-6 (Year: 2017).*
“Office Action of Korea Counterpart Application”, issued on Jun. 9, 2025, with English translation thereof, p. 1-p. 16.

(Continued)

*Primary Examiner* — Vladimir Magloire
*Assistant Examiner* — Anna K. Gosling
(74) *Attorney, Agent, or Firm* — Ladas & Parry, LLP

(57) ABSTRACT

Provided is a method of tracking multiple targets using an active electronically scanned array (AESA) radar. More particularly, provided is a method of tracking multiple targets using an AESA radar in an air-to-air mode based on the priorities and tracking information of the multiple targets.

14 Claims, 12 Drawing Sheets

(56) References Cited

OTHER PUBLICATIONS

The TWZ Newsletter, “We Talk F-15EX’s New Radar With The Woman Who Runs The Program Behind It”, Apr. 2021, available at: https://www.twz.com/40098/we-talk-f-15exs-new-radar-with-the-woman-who-runs-the-program-behind-it.
Young-Jin Park et al., “Adaptive Radar Task Scheduling Algorithm Considering the Target Priority”, KSAS 2017 Fall Conference, submit with Machine English translation, Nov. 2017, pp. 1-6.
Young-Jin Park et al., “Fuzzy logic approach for target prioritization in airborne AESA radars”, KSAS 2018 Spring conference, submit with Machine English translation, Apr. 2018, pp. 1-6.
“Written Opinion of the International Searching Authority (Form PCT/ISA/237) of PCT/KR2024/007685,” mailed on Nov. 1, 2024, with English translation thereof, pp. 1-10.

* cited by examiner

FIG. 8A

| MODE | SUB-MODE | NUMBER OF TARGETS OF INTEREST | NUMBER OF HIGH-PRIORITY TARGETS | NUMBER OF SITUATION AWARENESS TARGETS | MAXIMUM NUMBER OF DISPLAY TARGETS | MAXIMUM NUMBER OF NON-DISPLAY TARGETS |
|---|---|---|---|---|---|---|
| SWT-BASED MODE | NAST | $N_{TOI\_MAX}$ | $N_{HPT\_MAX}$ | $N_{DISP\_MAX} - (N_{TOI} + N_{HPT})$ | $N_{DISP\_MAX}$ | $N_{NODISP\_MAX}$ |
| | AAST | $N_{TOI\_MAX}$ | $N_{HPT\_MAX}$ | $N_{DISP\_MAX} - (N_{TOI} + N_{HPT})$ | $N_{DISP\_MAX}$ | $N_{NODISP\_MAX}$ |
| ACM-BASED MODE | HUD | 1 | 0 | 0 | 1 | 1 |
| | Bore | 1 | 0 | 0 | 1 | 1 |
| | VS | 1 | 0 | 0 | 1 | 1 |
| | Slew | 1 | 0 | 0 | 1 | 1 |

FIG. 8B

| MODE | SUB-MODE | NUMBER OF TARGETS OF INTEREST | NUMBER OF HIGH-PRIORITY TARGETS | NUMBER OF SITUATION AWARENESS TARGETS | MAXIMUM NUMBER OF DISPLAY TARGETS | MAXIMUM NUMBER OF NON-DISPLAY TARGETS |
|---|---|---|---|---|---|---|
| SWT-BASED MODE | NAST | 0 | 0 | $N_{DISP\_MAX}$ | $N_{DISP\_MAX}$ | 0 |
| | AAST | 0 | 0 | $N_{DISP\_MAX}$ | $N_{DISP\_MAX}$ | 0 |
| ACM-BASED MODE | UNAVAILABLE IN INTERLEAVED MODE | | | | | |

FIG. 9A

| DISTANCE (NM) | DWELL TIME (ms) OF SEARCH BEAM | DWELL TIME (ms) OF TRACKING BEAM | DISPLAY TARGET (Hz) | NON-DISPLAY TARGET (Hz) |
|---|---|---|---|---|
| 60~ | 150 | 60 | 1.0 | 0.5 |
| 40~60 | 130 | 45 | 1.2 | |
| 30~40 | 100 | 40 | 1.3 | |
| 25~30 | 70 | 30 | 1.5 | |
| 20~25 | 70 | 20 | 1.7 | |
| 15~20 | 70 | 15 | 2 | |
| 10~15 | 70 | 12 | 2.3 | |
| 5~10 | 50 | 10 | 2.5 | |
| 1~5 | 50 | 5 | 4 | |

FIG. 9B

| DISTANCE (NM) | NUMBER OF DISPLAY TARGETS (Max_DISP=20) | NUMBER OF NON-DISPLAY TARGETS (Max_NONDISP=200) | TOTAL NUMBER OF TRACKING TARGETS |
|---|---|---|---|
| 60~ | 12 | 0 | 12 |
| 40~60 | 14 | 0 | 14 |
| 30~40 | 15 | 0 | 15 |
| 25~30 | 18 | 0 | 18 |
| 20~25 | 20 | 9 | 29 |
| 15~20 | 20 | 24 | 44 |
| 10~15 | 20 | 32 | 52 |
| 5~10 | 20 | 60 | 80 |
| 1~5 | 20 | 128 | 148 |

METHOD AND SYSTEM FOR TRACKING MULTIPLE TARGETS USING ACTIVE ELECTRONICALLY SCANNED ARRAY RADAR

CROSS-REFERENCE TO RELATED APPLICATION

This application is based on and claims priority under 35 U.S.C. § 119 to Korean Patent Application No. 10-2023-0098890, filed on Jul. 28, 2023, in the Korean Intellectual Property Office, the disclosure of which is incorporated by reference herein in its entirety.

BACKGROUND

1. Field

The disclosure relates to a method and system for tracking multiple targets, and more particularly, to a method and system for tracking multiple targets using an active electronically scanned array (AESA) radar in an air-to-air mode based on the priorities and tracking information of the multiple targets.

2. Description of the Related Art

An active electronically scanned array (AESA) radar steers beams at a markedly high speed through electronic beam steering and thus has a highly improved multiple target processing ability with high tracking accuracy for multiple targets compared with an existing mechanical beam steering radar. In general, an existing mechanical radar tracks multiple targets using a track-while-scan (TWS) method, in which targets are tracked using only the results of a search beam without a separate tracking beam. Therefore, when a target leaves the search area, the mechanical radar loses target tracking. Target tracking using a search beam without a separate tracking beam has low tracking accuracy because a tracking beam is not accurately directed toward the target's location, and when a pilot designates one or two targets as engagement targets from among multiple targets that are being tracked with low accuracy, only the designated targets may be managed and tracked with high priority.

However, the AESA radar uses a search-while-track (SWT) method in which multiple targets are tracked by respectively allocating separate tracking beams to the multiple targets. Therefore, the AESA radar has much higher tracking accuracy for multiple targets and may thus track more engaged targets. In addition, the AESA radar may operate tracking beams differentially for multiple targets by considering weapons mountable on a fighter jet and the purpose of a mission, and may thus provide different tracking accuracies for different targets.

SUMMARY

Provided is a method of tracking multiple targets using an active electronically scanned (AESA) radar based on the priorities and tracking information of multiple targets.

Provided is a system for tracking multiple targets using an AESA radar based on the priorities and tracking information of the multiple targets.

Additional aspects will be set forth in part in the description which follows and, in part, will be apparent from the description, or may be learned by practice of the presented embodiments of the disclosure.

According to an aspect of the disclosure, there is provided a method of tracking multiple targets using an active electronically scanned array (AESA) radar. The method includes acquiring tracking information including a tracking mode for each of the multiple targets, allocating a target priority to each of the multiple targets based on the tracking information on each of the multiple targets and preset priority rules, extracting, based on the target priorities of the multiple targets, a plurality of tracking targets having a first tracking mode as the tracking mode from the multiple targets, extracting a plurality of tracking candidate targets having a second tracking mode as the tracking mode from the multiple targets excluding the plurality of tracking targets, setting a plurality of display targets by selecting as many targets as a preset maximum number of display targets from the plurality of tracking targets in order of highest to lowest of the target priorities of the plurality of tracking targets, setting non-display targets by selecting the plurality of tracking targets excluding the plurality of display targets, and tracking the plurality of display targets, wherein the acquiring of the tracking information on each of the multiple targets includes, when the tracking information on at least one target among the multiple targets changes, changing the tracking mode for each of the multiple targets based on the target priority of each of the multiple targets, a distance from the AESA radar to each of the multiple targets, and a preset maximum display range.

For example, the tracking information on at least one target among the plurality of targets may include angle information including an azimuth angle and elevation angle of the at least one target according to a location of the at least one target, a tracking mode for the at least one the target, a distance from the at least one target to the AESA radar, engagement information on the at least one target, and a target priority of the at least one target.

For example, the allocating of the target priority to each of the multiple targets may include setting targets engaged in combat with the AESA radar from among the plurality of tracking targets as targets of interest and respectively allocating target priorities to the targets of interest in order of engagement start times of the targets of interest, from most recent to oldest, setting, as high-priority targets, targets in a standby mode for engagement with the AESA radar from among the plurality of tracking targets excluding the targets of interest, respectively allocating target priorities to the high-priority targets based on the preset priority rules, setting, as situational awareness targets, targets in a non-combat mode with the AESA radar from among the plurality of display targets excluding the targets of interest and the high-priority targets, respectively allocating target priorities to the situational awareness targets based on the preset priority rules, and allocating, based on the preset priority rules, target priorities to the non-display targets, respectively, among the plurality of tracking targets.

For example, the method may further include comparing the target priorities of the situational awareness targets and the target priorities of the non-display targets with each other, wherein when the target priority of a first non-display target among the non-display targets is higher than the target priority of a first situational awareness target among the situational awareness targets, the first non-display target may be switched to a situational awareness target, and the first situation awareness target is switched to a non-display target.

For example, when a number of the plurality of tracking targets is equal to a total of the preset maximum number of display targets and a preset maximum number of non-display targets, the method may further include detecting a first tracking candidate target from among the plurality of tracking candidate targets.

For example, the detecting of the first tracking candidate target from among the plurality of tracking candidate targets may include acquiring tracking information on the first tracking candidate target; and when a distance from the AESA radar to the first tracking candidate target is greater than or equal to the preset maximum display range, and the target priority of the first tracking candidate target is higher than a lowest target priority among the target priorities of the plurality of display targets, changing the tracking mode of the first tracking candidate target to the first tracking mode and switching the first tracking candidate target to a situational awareness target.

For example, the acquiring of tracking information on the first tracking candidate target may include, when the distance from the AESA radar to the first tracking candidate target is greater than or equal to the preset maximum display range, and the target priority of the first tracking candidate target is lower than the lowest target priority among the target priorities of the plurality of display targets, determining whether the first tracking candidate target is within a preset search area.

For example, the determining of whether the first tracking candidate target is within the preset search area may include determining whether an azimuth angle and an elevation angle of the first tracking candidate target are respectively within an azimuth angle range and an elevation angle range of the preset search area, changing a tracking mode for the first tracking candidate target to the first tracking mode and switching the first tracking candidate target to the non-display target when the first tracking candidate target is within the preset search area, and setting the second tracking mode as the tracking mode for the first tracking candidate target when the first tracking candidate target is not within the preset search area.

For example, the target priorities may be calculated according to the preset priority rules based on an elevation of each of the multiple targets according to a location of each of the multiple targets, an angle of each of the multiple targets from a center of the AESA radar, a distance to each of the multiple targets from the AESA radar, and an approach speed of each of the multiple targets toward the AESA radar.

For example, when the AESA radar is in a close combat mode for the multiple targets, the targets of interest may be set as the plurality of display targets, and the plurality of tracking targets excluding the targets of interest may be switched to the plurality of tracking candidate targets having the second tracking mode.

According to another aspect of the disclosure, there is provided a method of tracking multiple targets using an AESA radar. The method includes acquiring tracking information including a tracking mode for each of the multiple targets, allocating a target priority to each of the multiple targets based on the tracking information on each of the multiple targets and preset priority rules, setting a plurality of situational awareness targets by selecting as many targets as a preset maximum number of display targets from the multiple targets in order of highest to lowest of the target priorities of the multiple targets; and tracking the plurality of situational awareness targets, wherein when tracking information of at least one target among the multiple targets changes, the method further includes reallocating a target priority to each of the multiple targets and resetting the plurality of situational awareness targets based on the target priorities.

According to another aspect of the disclosure, a computer program is stored in a medium to execute, by using a computing device, the method of tracking multiple targets described above.

According to another aspect of the disclosure, there is provided a system for tracking multiple targets, the system including an AESA radar and a target management unit configured to manage the multiple targets. The target management unit includes a tracking information acquisition unit configured to acquire tracking information including a track mode for each of the multiple targets, a priority allocation unit configured to allocate a target priority to each of the multiple targets based on the tracking information on each of the multiple targets and preset priority rules, a tracking target extraction unit configured to extract a plurality of tracking targets having a first tracking mode from the multiple targets based on the target priorities, a display target setting unit configured to set a plurality of display targets by selecting as many tracking targets as a preset maximum number of display targets from among the plurality of tracking targets in order of highest to lowest of the target priorities, and a target tracking unit configured to track the plurality of display targets. The tracking information acquisition unit is further configured to, when tracking information on at least one target among the multiple targets changes, change the tracking mode for each of the multiple targets based on the target priority of each of the multiple targets, a distance from the AESA radar to each of the multiple targets, and a preset maximum display range.

For example, the target management unit may further include a tracking candidate extraction unit configured to extract a plurality of tracking candidate targets having a second tracking mode from among the multiple targets excluding the plurality of tracking targets, a non-display target setting unit configured to set each of the plurality of tracking targets excluding the plurality of display targets as a non-display target, and a target output unit configured to output results of tracking the plurality of display targets using the target tracking unit.

For example, the target management unit may further include a target detection unit configured to detect at least one tracking candidate target among the plurality of tracking candidate targets when a number of the plurality of tracking targets is equal to a total of the preset maximum number of display targets and a preset maximum number of non-display targets.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8A is a view illustrating the maximum numbers of targets according to types of targets when switching between air-to-air modes according to an embodiment;

FIG. 8B is a view illustrating the maximum numbers of targets according to types of targets in air-to-air modes of an interleaved mode, according to another embodiment.

FIG. 9A is a view illustrating, by example, the dwell time of a radar's search beam, the dwell time of a radar's tracking beam, and tracking frequencies for a display target and a non-display target with respect to radar-to-target distances, according to an embodiment; and FIG. 9B is a view illustrating, by example, the maximum numbers of trackable targets with respect to radar-to-target distances, according to an embodiment.

DETAILED DESCRIPTION

Figure 1:
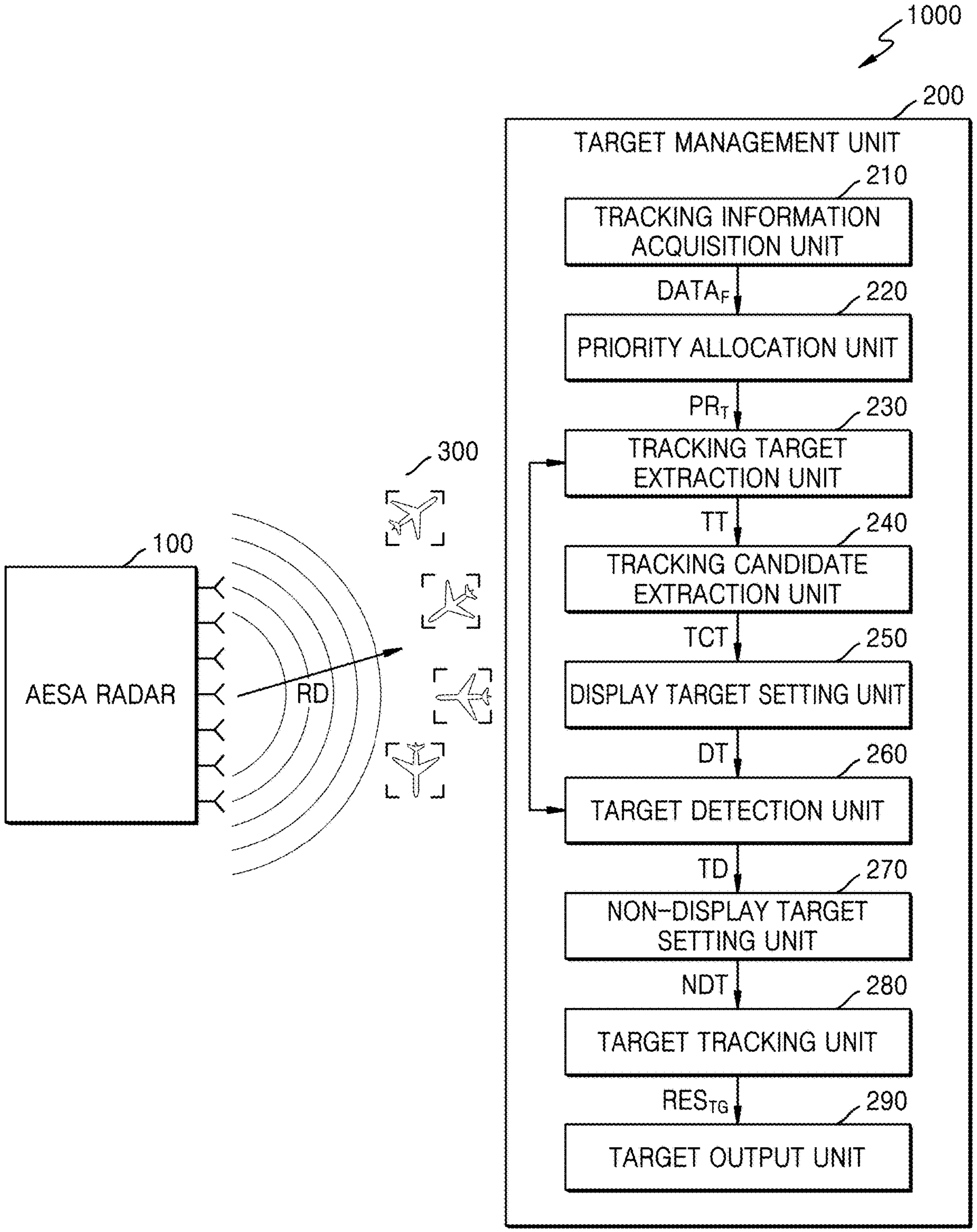
FIG. 1 is a block diagram schematically illustrating a system for tracking multiple targets using an active electronically scanned array (AESA) radar according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments are described with reference to the accompanying drawings.

Prior to the description, it should be understood that the terms used herein should not be construed as limited to general and dictionary meanings, and the inventor is allowed to define terms appropriately for the best explanation. In addition, it should be understood that the terms used herein should be interpreted based on the meanings and concepts corresponding to technical aspects of the disclosure. That is, the terms used herein are only for describing specific embodiments while not limiting the disclosure. In addition, it should be noted that these terms are defined by considering various possibilities of the disclosure.

In this specification, singular forms may include plural forms as well unless the context clearly indicates otherwise. Similarly, plural forms may include singular forms.

Furthermore, in the specification, when a portion or element is referred to as being connected to another portion or element, the portion or element may be directly connected to the other portion or element, or may be connected to the other portion or element with intervening portions or elements being therebetween. It will be further understood that the terms "comprises" and/or "comprising" used herein specify the presence of stated features or elements, but do not preclude the presence or addition of one or more other features or elements.

Terms such as "first" and "second" are used herein to distinguish various elements from each other without considering the order or importance of the elements.

Moreover, in the specification, terms such as "unit" or "module" may be used to denote a unit that has at least one function or operation. The unit may be implemented with hardware, software, or a combination of hardware and software.

In the following description, detailed descriptions of configurations such as well-known techniques may be ruled out in order not to unnecessarily obscure subject matters of the disclosure.

FIG. 1 is a schematic block diagram illustrating a system 1000 for tracking multiple targets by using an active electronically scanned array (AESA) radar 100 according to an embodiment.

Referring to FIG. 1, the system 1000 includes the AESA radar 100 and a target management unit 200 configured to manage a plurality of targets 300. The system 1000 may further include the targets 300 to be tracked using the AESA radar 100. The AESA radar 100 may function as a missile data link (MDL) by transmitting target information to a guided missile in accordance with a communication protocol of the guided missile for mid-term guidance of the guided missile and receiving information on the state of the guided missile.

The target management unit 200 may include a tracking information acquisition unit 210, a priority allocation unit 220, a tracking target extraction unit 230, a display target setting unit 250, and a target tracking unit 280. The target management unit 200 may further include a tracking candidate extraction unit 240, a target detection unit 260, a non-display target setting unit 270, and a target output unit 290.

The tracking information acquisition unit 210 may acquire tracking information $DATA_F$ on each of the targets 300, and the tracking information may include a tracking mode for each of the targets 300. When tracking information $DATA_F$ on at least one of the targets 300 changes, the tracking information acquisition unit 210 may change the tracking mode for each of the targets 300 based on the target priority of each of the targets 300, the distance from the AESA radar 100 to the each of the targets 300, and a preset maximum display range. The tracking information $DATA_F$ on at least one of the targets 300 may include angle information including the azimuth angle and elevation angle of the at least one target 300 according to the location of the at least one target 300; a tracking mode for the at least one target 300, the distance from the at least one target 300 to the AESA radar 100, engagement information on the at least one target 300, and the target priority of the at least one target 300. The tracking information acquisition unit 210 may transmit the tracking information $DATA_F$ on each of the targets 300 to the priority allocation unit 220.

The priority allocation unit 220 may allocate a target priority $PR_T$ to each of the targets 300 based on the tracking information $DATA_F$ on each of the targets 300 and preset priority rules. The target priority $PR_T$ may be calculated according to the preset priority rules, based on the elevation of each of the targets 300 according to the location of each of the targets 300, the angle formed by each of the targets 300 from the center of the AESA radar 100, the distance from the AESA radar 100 to each of the targets 300, and the approach speed of each of the targets toward the AESA radar 100. A target priority allocation method is described with reference to FIG. 5. In an embodiment, the targets 300 may be classified into tracking targets and non-tracking targets according to the target priorities $PR_T$ of the targets 300, and the tracking targets may be further classified into display targets and non-display targets. The display targets may be set as targets of interest (TOIs), high-priority targets, and situational awareness targets based on the target priorities $PR_T$ and the tracking information $DATA_F$. The priority allocation unit 220 may transmit the target priorities $PR_T$ allocated to the targets 300 to the tracking target extraction unit 230.

The tracking target extraction unit 230 may extract a plurality of tracking targets TT having a first tracking mode from the targets 300 based on the target priorities $PR_T$. The tracking target extraction unit 230 may transmit the extracted tracking targets TT to the tracking candidate extraction unit 240. When the number of tracking targets TT reaches a total of a preset maximum number of display targets and a preset maximum number of non-display targets, the tracking target extraction unit 230 may cause the target detection unit 260 to further detect at least one target among a plurality of tracking candidate targets TCT.

When the number of tracking targets TT is equal to the sum of a preset maximum number of display targets and a preset maximum number of non-display targets, the target detection unit 260 may detect at least one tracking candidate target among the tracking candidate targets TCT. The target detection unit 260 may include a detection sensor configured to detect targets.

The tracking candidate extraction unit 240 may extract a plurality of tracking candidate targets TCT having a second tracking mode from among the targets 300 except for the tracking targets TT. The tracking candidate targets TCT may be candidate targets from which the target detection unit 260 detects a new tracking target.

The display target setting unit 250 may set a plurality of display targets DT by selecting as many tracking targets TT as the preset maximum number of display targets DT from the tracking targets TT in order of highest to lowest of the target priorities $PR_T$. The display target setting unit 250 may transmit information on the display targets DT to the target tracking unit 280. The non-display target setting unit 270 may set the tracking targets TT other than the display targets DT as non-display targets NDT.

Figure 6:
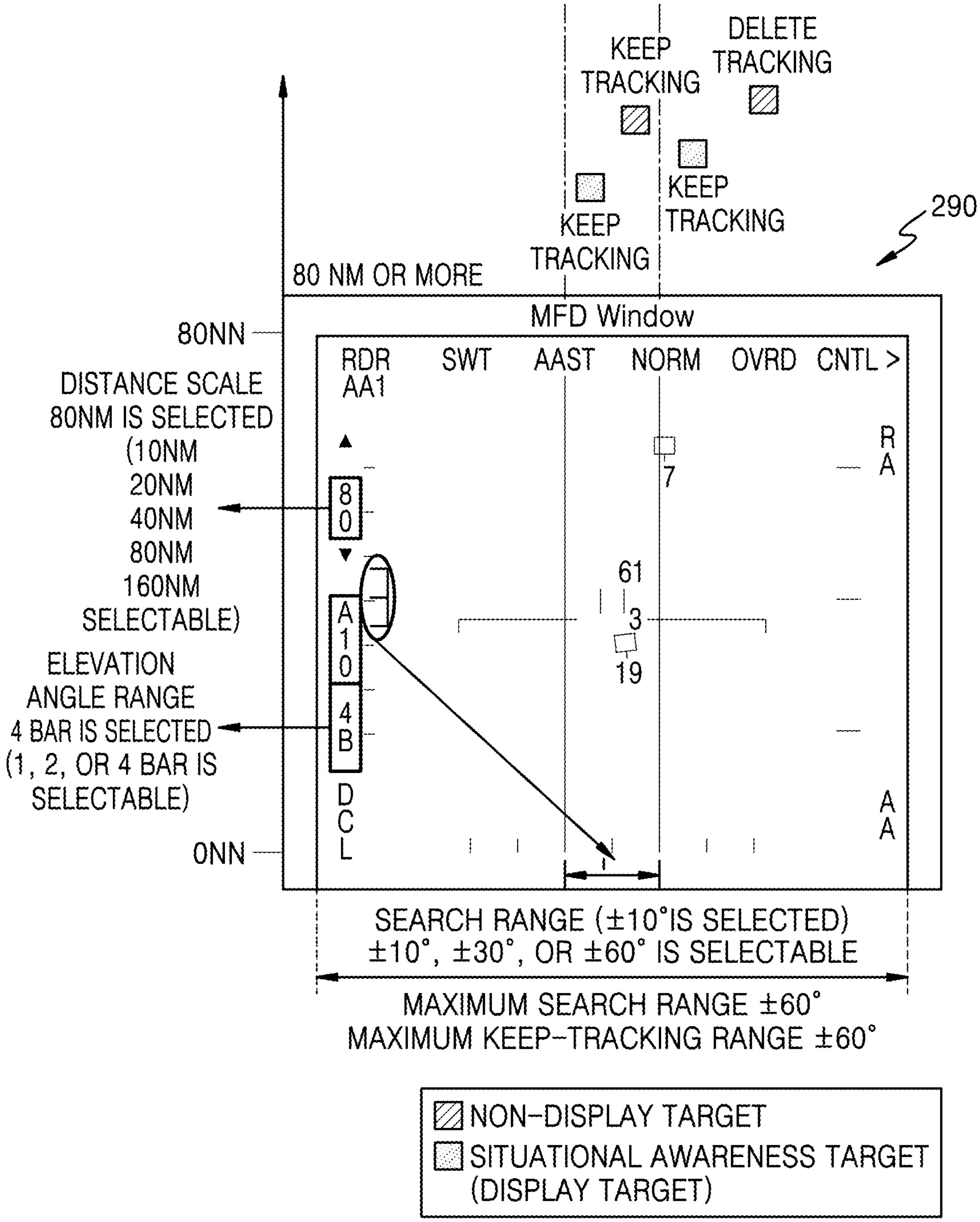
FIG. 6 is a view illustrating an example of a target output unit of a system for tracking multiple targets, according to an embodiment.

The target tracking unit 280 may track the display targets DT. The target output unit 290 may output results of the tracking performed on the display targets DT by the target tracking unit 280. For example, the target output unit 290 may be a multi-function display (MFD) as shown in FIG. 6.

Figure 2:
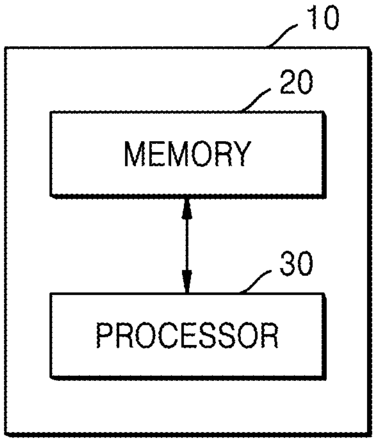
FIG. 2 is a block diagram schematically illustrating a computing device for executing a method of tracking multiple targets according to an embodiment.

FIG. 2 is a block diagram schematically illustrating a computing device 10 for executing a method of tracking multiple targets according to an embodiment.

Referring to FIG. 2, the computing device 10 includes a memory 20 and a processor 30.

The memory 20 may be a recording medium that is readable by the computing device 10, and may include a permanent mass storage device such as a random access memory (RAM), a read only memory (ROM), or a disk drive.

In an embodiment, the memory 20 stores program code for executing the method of tracking multiple targets, data required for executing the program code, and data generated while executing the program code. The program code may include algorithm code for executing priority rules to allocate target priorities to a plurality of targets.

According to an embodiment, the memory 20 may store data required for executing the method of tracking multiple targets. For example, the memory 20 may store data regarding a preset maximum number of display targets, a preset maximum number of non-display targets, and a preset maximum display range that are selected by simulation runs. The memory 20 may store data regarding a search area including azimuth and elevation angles required for the method of tracking multiple targets. The memory 20 may store tracking information on each of a plurality of targets. For example, the memory 20 may include, for each of a plurality of targets, angle information including the azimuth angle and elevation angle of the target according to the location of the target, a tracking mode for the target, the distance from the target to a radar, engagement information on the target, and the priority of the target. The memory 20 may store, for each of a plurality of targets, data regarding whether a target is a display target or a non-display target. For each of a plurality of targets, the memory 20 may store data regarding whether a target is at least one selected from the group consisting of targets of interest, high-priority targets, and situational awareness targets.

In general, the processor 30 controls the overall operation of the computing device 10. The processor 30 may be configured to execute instructions of a computer program by performing basic arithmetic, logic, and input/output operations. In an embodiment, the processor 30 may calculate and allocate priorities respectively to a plurality of targets using predefined priority rules. The processor 30 may receive data stored in the memory 20 and transmit the data to the memory 20.

According to an embodiment, the computing device 10 may further include a communication module, an input/output device, or a storage device in addition to the memory 20 and the processor 30. For example, the computing device 10 may receive, through the communication module, information such as angle information including the azimuth and elevation angles of each of a plurality of targets according to the location of each of the targets, a tracking mode for each of the targets, the distance from a radar to each of the targets, or target engagement information.

Operations of the processor 30 in various embodiments are described below.

Figure 3:
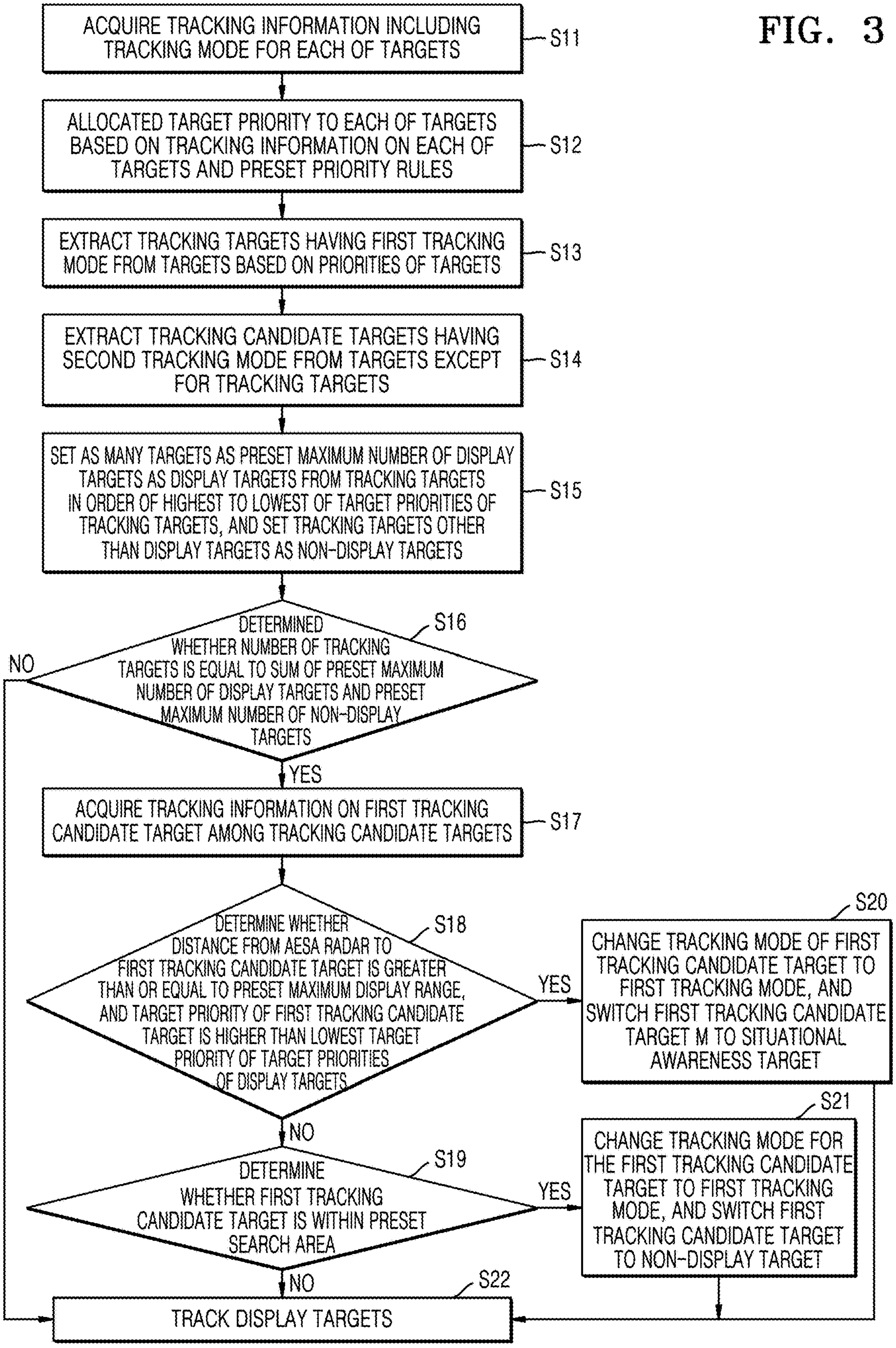
FIG. 3 is a flowchart illustrating a method of tracking multiple targets using an AESA radar according to an embodiment.

FIG. 3 is a flowchart illustrating a method of tracking multiple targets using an AESA radar according to an embodiment.

Tracking information including a tracking mode for each of a plurality of targets may be acquired (S11). According to an embodiment, when the number of targets being tracked varies or tracking information on targets is updated, that is, tracking information on at least one target among a plurality of targets changes, the changed tracking information may be acquired. According to an embodiment, when tracking information on at least one of a plurality of targets changes, the tracking mode for each of the targets may be changed based on the target priority of each of the targets, the distance from the AESA radar to each of the targets, and a preset maximum display range. For example, when tracking information on a target that is being tracked by the AESA radar in a first tracking mode changes, the target may be switched to a target having a second tracking mode in which the AESA radar does not track the target.

A target priority may be allocated to each of the targets based on the tracking information on each of the targets and preset priority rules (S12). The tracking information on each of the targets may include angle information including the azimuth angle and elevation angle of the target according to the location of the target, a tracking mode indicating whether the AESA radar is tracking the target, the distance from the target to the AESA radar, engagement information indicating whether the AESA radar engages the target as an engagement target, and the target priority of the target. For example, it may be determined, based on angle information on a target, whether the target is within a preset search area. The target priority of each of the targets may be calculated according to the preset priority rules based on the elevation of the target according to the location of the target, the angle of the target from the center of the AESA radar, the distance from the AESA radar to the target, and the approach speed of the target toward the AESA radar. For example, the threat level of a target increases as the distance from the target to the AESA radar decreases, the speed of the target at which the target approaches the AESA radar increases, and the angle of the target from the center of the AESA radar decreases. In this case, a high target priority may be allocated to the target.

A plurality of tracking targets having a first tracking mode may be extracted from the targets based on the target priorities of the targets (S13). The first tracking mode may be a mode of targets that are being tracked by the AESA radar. The tracking targets having the first tracking mode may have higher target priority than targets having the second tracking mode.

A plurality of tracking candidate targets having the second tracking mode may be extracted from among the targets except for the tracking targets (S14). The second tracking mode may be a tracking mode of targets that are not being tracked by the AESA. The tracking candidate targets having the second tracking mode may have lower target priority than the tracking targets having the first tracking mode.

As many targets as a preset maximum number of display targets may be set as display targets from the tracking targets in order of highest to lowest of the target priorities of the tracking targets, and the tracking targets other than the display targets may set as non-display targets (S15). The display targets are arranged in order of highest to lowest of the target priorities of the display targets, and the number of display targets may be the same as the preset maximum number of display targets having high target priorities. The display targets may be displayed on the target output unit 290 (refer to FIG. 1) among the tracking targets. Each of the display targets may be at least one of a target of interest, a high-priority target, and a situational awareness target. Classification of the display targets is described with reference to FIG. 5. The non-display targets are tracked by the AESA radar like the display targets, but are not displayed on the target output unit 290 (refer to FIG. 1). The non-display targets and the situational awareness targets of the display targets may be switched to each other by comparing the target priorities of the non-display targets and the target priorities of the situational awareness targets in real time.

It may be determined whether the number of tracking targets is equal to the sum of the preset maximum number of display targets and a preset maximum number of non-display targets (S16). The AESA radar is capable of tracking only as many targets as the total of the preset maximum number of display targets and the preset maximum number of non-display targets, and thus, it may be determined whether the number of tracking targets reaches the total.

When it is determined, as a result of the determining in operation S16, that the number of tracking targets is equal to the total of the preset maximum of display targets and the preset maximum number of non-display targets, at least one tracking target candidate may be detected among the tracking candidate targets (S17). When the number of tracking targets reaches the total, at least one tracking candidate target may be further detected among the tracking candidate targets that are not being tracked. When there is a detected tracking candidate target, the target priority of the detected candidate target may be compared with the target priorities of the tracking targets to prevent the number of tracking targets from exceeding the total. When there is a tracking candidate target detected in operation S17, the target priority of the detected tracking candidate target is compared with the target priorities of the tracking targets as follows (operations S18 to S21).

In operation S17, a first tracking candidate target may be detected from among the tracking candidate targets, and tracking information on the first tracking candidate target may be acquired. As in operation S11, the tracking information on the first tracking candidate target may include angle information including the azimuth angle and elevation angle of the first tracking candidate target according to the location of the first tracking candidate target, a tracking mode for the first tracking candidate target, the distance from the first tracking candidate target to the AESA radar, engagement information on the first tracking candidate target, and the target priority of the first tracking candidate target.

It may be determined whether the distance from the AESA radar to the first tracking candidate target is greater than or equal to the preset maximum display range, and the target priority of the first tracking candidate target is higher than the lowest target priority of the target priorities of the display targets (S18). The preset maximum display range refers to a display value for display on the target output unit 290 (refer to the MFD shown in FIG. 6), and may be arbitrarily set by a pilot.

When the distance from the AESA radar to the first tracking candidate target is greater than or equal to the preset maximum display range and the target priority of the first tracking candidate target is higher than the lowest target priority among the target priorities of the display targets, the tracking mode for the first tracking candidate target may be changed to the first tracking mode, and the first tracking candidate target may be switched to a situational awareness target (S20). A new target may be detected and tracked beyond the preset maximum display range. In this case, when the target priority of the new target determined based on tracking information on the new target (refer to FIG. 5) is within the range of the target priorities of the maximum number of display targets, the new target may be designated as a situational awareness target and may be being tracked by the AESA radar even though the current distance from the AESA radar to the new target is greater than or equal to the preset maximum display range.

When the distance from the AESA radar to the first tracking candidate target is greater than or equal to the preset maximum display range and the target priority of the first tracking candidate target is lower than the lowest target priority among the target priorities of the display targets, it may be determined whether the first tracking candidate target is within the preset search area (S19). In operation S19, it may be determined whether the azimuth angle and elevation angle of the first tracking candidate target are respectively within the azimuth angle and elevation range of the preset search area. The preset search area may include information about azimuth angle and elevation angle. According to another embodiment, when the distance between the AESA radar and a non-display target among the non-display targets changes from within the preset maximum display range to beyond the maximum display range, it may be determined whether the non-display target is within the preset search area.

Although not shown in FIG. 3, when the distance between the AESA radar and a display target among the display targets changes from within the preset maximum display range to beyond the preset maximum display range, the AESA radar may maintain tracking of the display target.

When the first tracking candidate target is located within the preset search area, the tracking mode for the first tracking candidate target may be changed to the first tracking mode, and the first tracking candidate target may be switched to a non-display target (S21). When the first tracking candidate target that is newly detected is located within the preset search area, the first tracking candidate target is not displayed on the MFD, but the tracking mode for the first tracking candidate target may be changed from the second tracking mode to the first tracking mode such that the AESA radar may internally maintain tracking of the first tracking candidate target.

When the first tracking candidate target is not located within the preset search area, the display targets may be tracked based on the target information set in previous operations S11 to S20 (S22). Although not shown in FIG. 3, when the first tracking candidate target is not located within the preset search area, the tracking mode for the first tracking candidate target may be set to be the second tracking mode. That is, the AESA radar does not track the first tracking candidate target. When the first tracking candidate target that is newly detected is not located within the preset search area, the AESA radar may track the display targets based on target information set to data without tracking the first tracking candidate target.

When the number of tracking targets is less than the total of the preset maximum number of display targets and the preset maximum number of non-display targets, the display targets may be tracked based on target information set until the current operation (S22). When the number of tracking targets is less than the total of the preset maximum number of display targets and the preset maximum number of non-display targets, it is possible for the AESA radar to track all the tracking targets, and thus, the AESA radar may track the display targets based on target information set to date. The display targets may be tracked based on target information set as a result of operations S11 to S21 (S22).

Although not shown in FIG. 3, an operation of comparing the target priority of a situational awareness target and the target priority of a non-display target with each other may be further included. When the target priority of a first non-display target among the non-display targets is higher than the target priority of a first situational awareness target among the situational awareness targets, the first non-display target may be switched to a situational awareness target, and the first situational awareness target may be switched to a non-display target.

Figure 4:
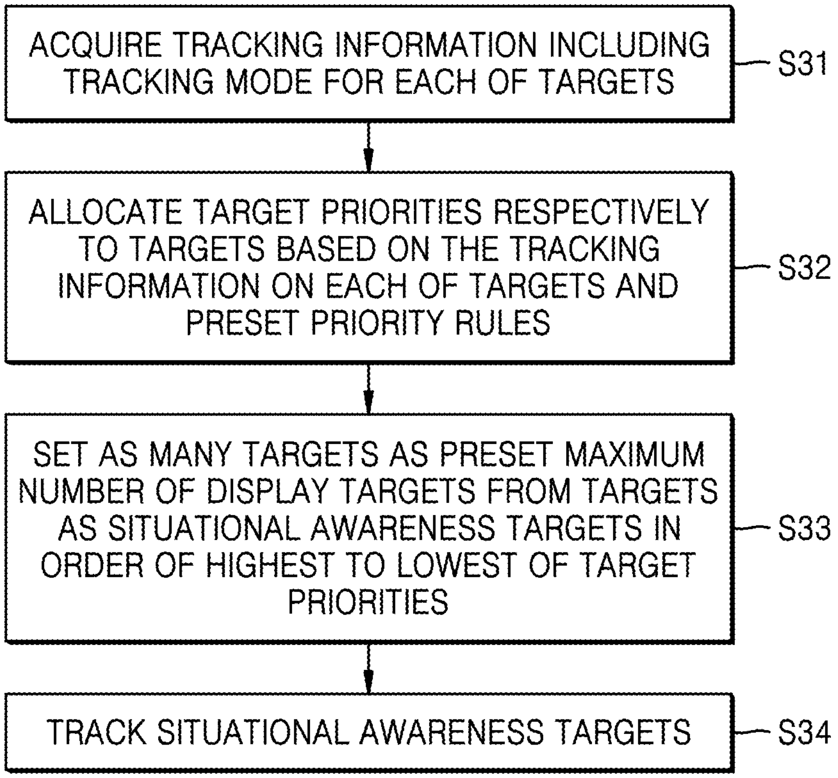
FIG. 4 is a flowchart illustrating a method of tracking multiple targets using an AESA radar according to another embodiment.

FIG. 4 is a flowchart illustrating a method of tracking multiple targets using an AESA radar according to another embodiment.

FIG. 4 illustrates a method of tracking multiple targets when the AESA radar switches from an air-to-air single mode to an interleaved mode for simultaneously performing operations in least two modes among an air-to-air mode, air-to-ground mode, air-to-sea mode, and an imaging mode, that is, the AESA radar operates simultaneously in the air-to-air mode and another mode. A conceptual diagram illustrating a method of managing multiple targets between the air-to-air single mode and the interleaved mode is described with reference to FIG. 7B.

Tracking information including a track mode for each of a plurality of targets may be acquired (S31). Target priorities may be respectively allocated to the targets based on the tracking information on each of the targets and preset priority rules (S32). The tracking information on each of the targets and the preset priority rules follow the tracking information described with reference to FIG. 3.

As many targets as a preset maximum number of display targets may be set from the targets as situational awareness targets in order of highest to lowest of the target priorities of the targets (S33). Only as many situational awareness targets as the preset maximum number of display targets may be set as display targets.

The situational awareness targets may be tracked (S34). In other words, tracking may be performed on display targets.

Although not shown in FIG. 4, when tracking information on at least one target among the targets changes, target priorities may be respectively reallocated to all the targets, and situational awareness targets may be reset based on the target priorities.

Figure 5:
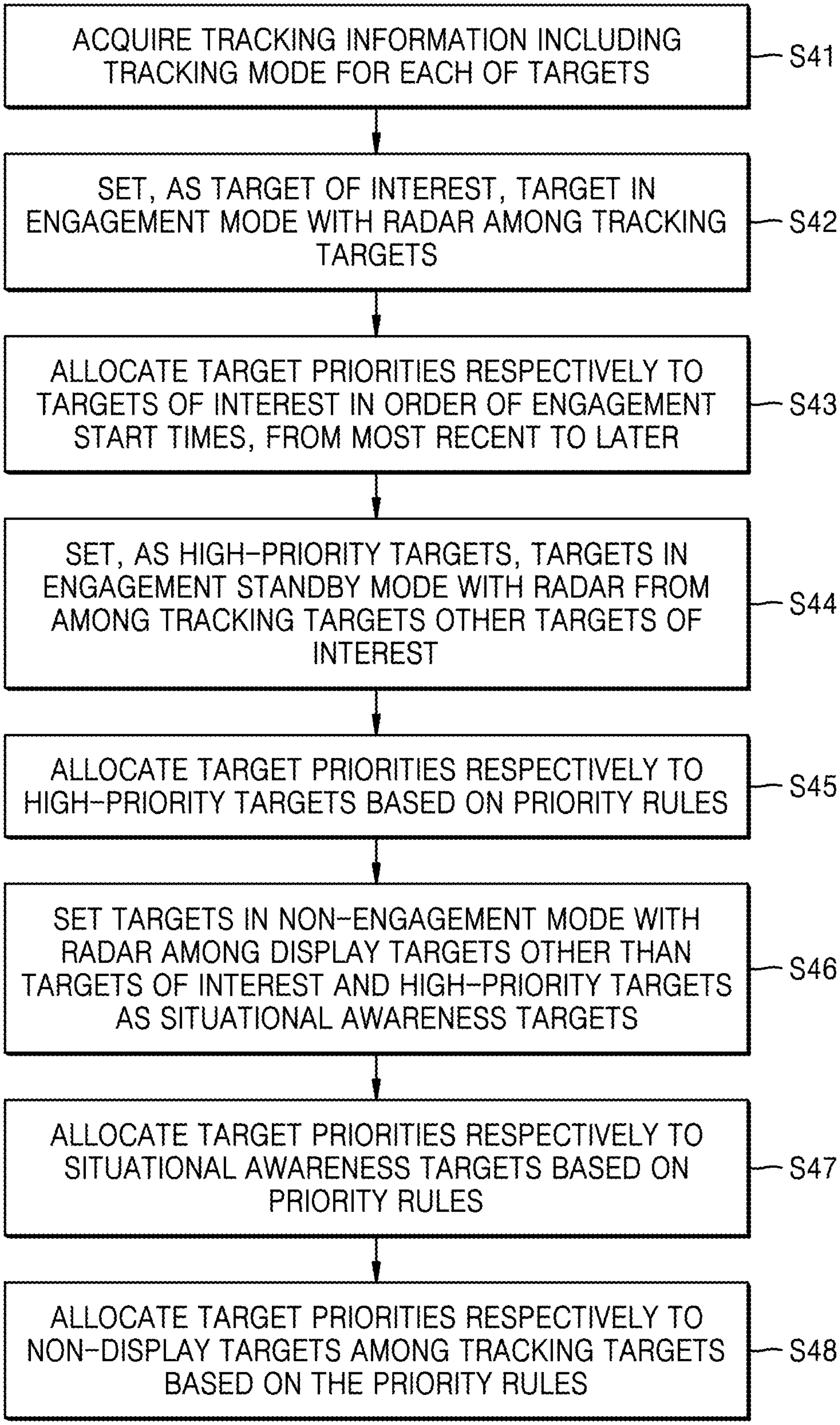
FIG. 5 is a flowchart illustrating a method of allocating target priorities to a plurality of targets according to an embodiment.

FIG. 5 is a flowchart illustrating a method of allocating target priorities to a plurality of targets according to an embodiment.

Radar is designed such that when a plurality of tracking beams are processed according to the tracking periods of the tracking beams in a situation of tracking a plurality of targets, the target priorities of the targets are determined to prepare a beam schedule for processing tracking beams without delay in tracking periods for high-priority targets. Low-priority targets may be tracked with tracking beams processed with relative delay, relatively low accuracy, or loss, and thus, the allocation of target priorities to respective targets may have an effect on the performance of radar.

Referring to FIG. 5, tracking information including a tracking mode for each of a plurality of targets may be acquired (S41). The priorities of the targets may be determined according to general target priority logic based on target tracking information acquired using a radar. For example, the target tracking information on each of the targets may include the distance between the target and the radar, the angle between the target and the center of the radar, the approach speed of the target toward the radar, and the elevation of the target. As the distance between the target and the radar increases, the angle between the target and the center of the radar decreases, the approach speed of the target toward the radar increases, and the elevation of the target decreases, the target may have a high threat level and may be allocated a high target priority. In an embodiment, as shown in FIG. 5, target priorities may be respectively allocated to the targets by a target priority allocating method based on target tracking information. For example, when the number of targets that are being tracked is changed or tracking information on targets that are being tracked is updated, new tracking information on the targets may be acquired.

Among a plurality of tracking targets, a target in an engagement mode with the radar may be set as a target of interest (S42). Targets for which a guided missile data link (MDL) function is being performed, that is, targets engaged in combat, may have higher priority than targets that are not engaged in combat. For example, the MDL function may be initiated when a pilot designates a target of interest and launches a missile at the target of interest. When the pilot designates another target as a target of interest before the engaged target of interest is shot down, the engaged target of interest may be displayed on an MFD with a separate symbol and may have higher priority than the newly designated target of interest. To provide the highest tracking accuracy to a guided missile with an MLD function for a target, tracking beam processing may be prioritized by allocating higher priority to an engaged target than to non-engaged targets.

Target priorities may be respectively allocated to targets of interest in order of engagement start times, from most recent to later (S43). For example, engaged targets with earlier MDL initiation times may be allocated higher target priorities than those with later MDL initiation times. During an engagement using a missile, the radar is required to provide highly accurate information on a target before a seeker operates, and thus, when there are a plurality of engaged targets for which the MDL function is being performed, engaged targets with earlier engagement initiation times may be allocated higher target priorities than those with later engagement initiation times to process tracking beams without delay. It may be determined whether there are targets that have not been allocated target priorities, and when all the targets have been allocated target priorities, the target priority allocation may be terminated.

Among the tracking targets other than the targets of interest, targets in an engagement standby mode with the radar may be set as high-priority targets (S44). Target priorities are respectively allocated to the high-priority targets based on priority rules (S45). In another example, when there are no engaged targets, target priorities may be allocated to targets in the engagement standby mode based on the priority rules. It may be determined whether there are targets that have not been allocated target priorities, and when all the targets have been allocated target priorities, the target priority allocation may be terminated.

Targets that are in a non-engagement mode with the radar among display targets other than the targets of interest and the high-priority targets may be set as situational awareness targets (S46). Target priorities may be respectively allocated to the situational awareness targets based on the priority rules (S47). For example, the number of situational awareness targets may be equal to a value acquired by subtracting the sum of the number of targets of interest and the number of high-priority targets from the lesser of the number of tracking targets and the maximum number of display targets. It may be determined whether there are targets that have not been allocated target priories, and when all the targets have been allocated target priorities, the target priority allocation may be terminated.

Target priorities may be respectively allocated to non-display targets among the tracking targets based on the priority rules (S48). In an example, the number of non-display targets may correspond to the lesser of the maximum number of non-display targets and a value acquired by subtracting the maximum number of display targets from the number of tracking targets. It may be determined whether there are targets that have not been allocated target priorities, and when all the targets have been allocated target priorities, the target priority allocation may be terminated.

Although not shown in FIG. 5, a target designated by a pilot may be allocated higher priority than the remaining targets. As long as the pilot does not change the priority of the designated target, the priority of the designated target may be maintained. In other words, targets of interest and high-priority targets designated by a pilot's request are not automatically switched to situational awareness targets according to target priorities determined by the radar based on tracking information. The targets of interest and the high-priority targets may be released by a pilot's request or when the targets are lost. When there are a plurality of situational awareness targets, target priorities of the situational awareness targets may follow target priorities that are determined by the radar based on existing tracking information.

FIG. 6 is a view illustrating an example of the target output unit 290 of the system 1000 for tracking multiple targets, according to an embodiment.

FIG. 6 schematically shows an example in which a plurality of targets are managed according to settings of the distance scale and search range of the target output unit 290. The target output unit 290 may be an MFD. The MFD may include information on a maximum display range and a search area. Hereinafter, the target output unit 290 is referred to as an MFD 290.

Although the AESA radar 100 tracks a plurality of targets, all the targets may not be displayed on a screen of the MFD 290 for a pilot because it may be difficult to separately check information such as the elevation, angle, distance, and speed of each of the targets, and identify targets engaged in combat. Thus, as shown in FIG. 6, the targets may be managed by setting the distance scale and search range of the MFD 290.

To perform radar missions, the pilot may set a radar search range (azimuth angle and elevation angle) and a display range scale (distance scale) on the MFD 290. FIG. 6 illustrates an example of a display screen of the MFD 290 in which a horizontal axis refers to an azimuth detection and tracking range, and a vertical axis refers to a maximum display range. For example, one of ±10 degrees, ±30 degrees, and ±60 degrees may be selected as the azimuth angle range of the search range, one of 1 bar, 2 bar, and 4 bar may be selected as the elevation angle range of the search range. In addition, one of 10 nautical miles (NM), 20 NM, 40 NM, 80 NM, and 160 NM may be selected as the maximum display range of the search range. FIG. 6 illustrates an example in which the azimuth angle range of the search range is set to ±10 degrees, the elevation angle range of the search range is set to 4 bar, and the maximum display range of the search range is set to 80 NM. Once the AESA radar 100 detects a new target within a search area, even when the target leaves the search area, the AESA radar 100 is generally capable of tracking the target up to an azimuth angle of ±60 degrees and an elevation angle of ±60 degrees, and the azimuth angle of the target is displayed up to ±60 degrees on the screen of the MFD 290. Therefore, there is no need to consider target management measures for the azimuth angle range. In addition, the pilot may check target information by setting the distance scale of the MFD 290 to a distance of interest. Target management methods relating to a distance scale are described below.

A new target may be detected and tracked beyond the set maximum display range, and the priority of the new target may be determined based on tracking information (refer to FIG. 5) to be within the rankings of a maximum number $N_{DISP\_MAX}$ of display targets. In this case, although the new target is outside the current distance scale and is thus not immediately displayed, the new target is designated as a situational awareness target and kept on track by the AESA radar 100. This helps achieve quick situational awareness in case the pilot changes the distance scale, and also helps prevent the waste of radar resources because the AESA radar 100 continuously repeats detection, initiation of tracking, and deletion of the new target as long as the new target is within the AESA radar detection range. A target may be detected beyond the set maximum display range, and the priority of the target may be determined based on tracking information (refer to FIG. 5) to be outside the rankings of the maximum number $N_{DISP\_MAX}$ of display targets. In this case, it may be determined whether the target being tracked is within the search area. Tracking of the target is maintained while the target is within the search area and is terminated when the target leaves the search area.

Even when a display target that is being tracked within the display range (maximum display range) of the MFD 290 moves away outside the maximum display range of the MFD 290, the AESA radar 100 maintains tracking of the display target. A non-display target that is being tracked within the display range (maximum display range) of the MFD 290 may move away outside the display range of the MFD 290. In this case, as described above, the AESA radar 100 may maintain tracking of the non-display target while the non-display target is within the search area and stops tracking of the non-display target when the non-display target leaves the search area. The AESA radar 100 maintains tracking of engaged targets, targets of interest, and high-priority targets regardless of the distance scale, and maintains the target priorities of the engaged targets, the targets of interest, and the high-priority targets.

Figure 7A:
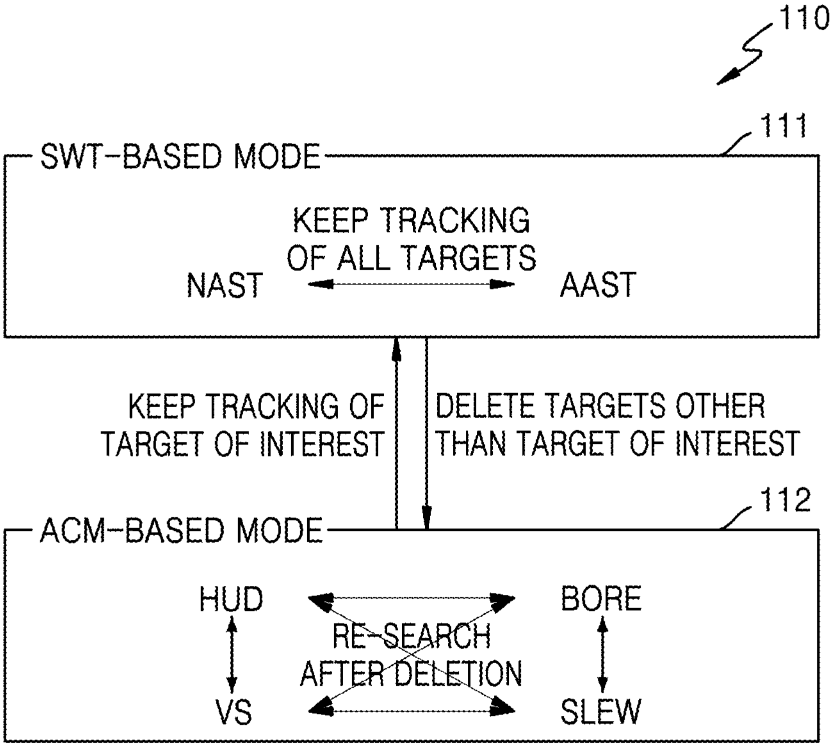
FIG. 7A is a conceptual diagram schematically illustrating a method of managing multiple targets when switching between air-to-air modes according to an embodiment.
Figure 7B:
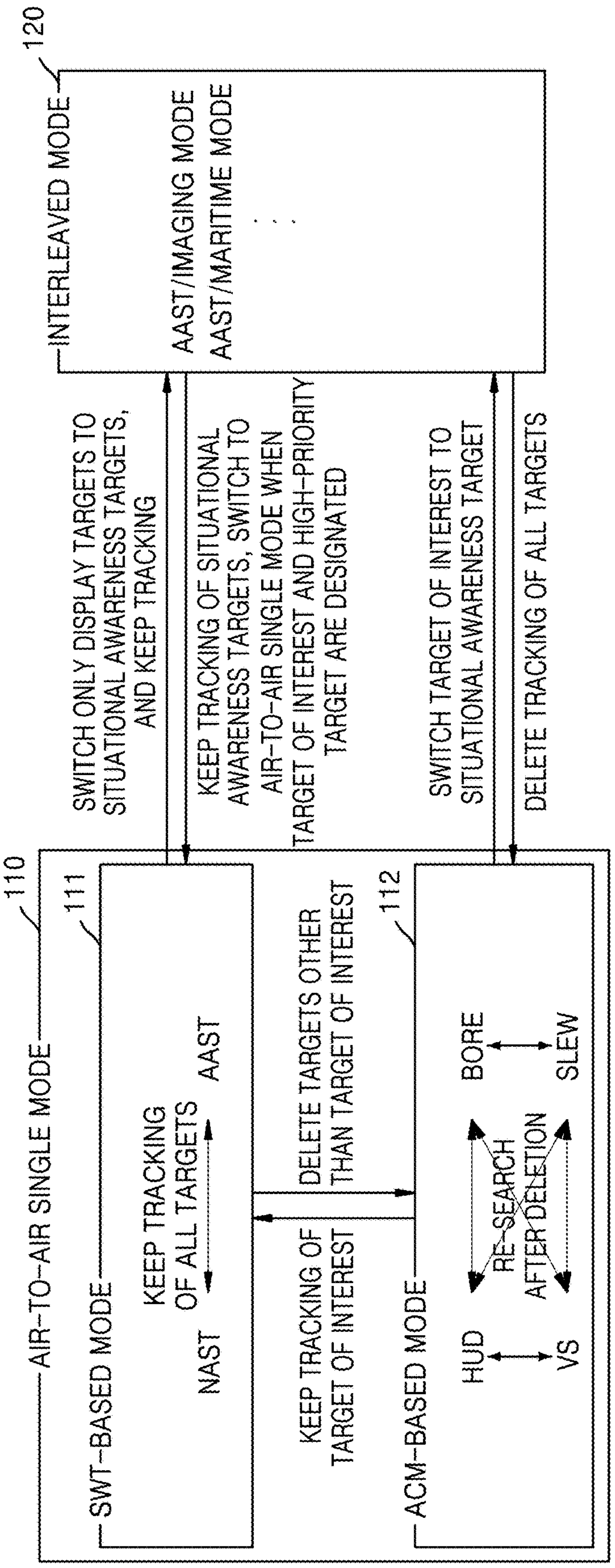
FIG. 7B is a conceptual diagram schematically illustrating a method of managing multiple targets when switching between an air-to-air single mode and an interleaved mode according to another embodiment.

FIGS. 7A and 7B are conceptual diagrams illustrating a method of managing multiple targets when switching between air-to-air modes. Air-to-air operation modes and functions using AESA radar may be divided into: a search-while-track (SWT)-based mode 111 used for situational awareness, target detection, and tracking; and an air combat maneuvering (ACM)-based mode 112 used for close combat. The SWT-based mode 111 may be divided into a nose aspect search and track (NAST) mode, which is optimized for detecting long-range targets approaching at high speed, and an all aspect search and track (AAST) mode for detecting targets in all directions. The ACM-based mode 112 may be divided into four sub-operation modes (head-up display (HUD) scan, boresight, vertical scan, and slewable) depending on search areas.

FIG. 7A is a conceptual diagram schematically illustrating a method of managing multiple targets when switching between air-to-air modes according to an embodiment.

Referring to FIG. 7A, when the AESA radar is in a close combat mode (ACM-based mode 112) of an air-to-air single mode 110 with respect to a plurality of targets, a target of interest may be set as a display target, and targets other than the target of interest among a plurality of tracking targets may be switched to tracking candidate targets. When there is no target of interest, detection may be performed on a plurality of targets, and a first detected target may be set as a target of interest.

In the SWT-based mode 111 for tracking, all tracking targets may be maintained when switching between the NAST mode and the AAST mode, and the target priorities of targets may also be maintained. That is, during switching between the NAST mode and the AAST mode, a target of interest and a high-priority target may be maintained unless a pilot intervenes. After switching from the SWT-based mode 111 including the NAST mode and the AAST mode to the ACM-based mode 112 that is a close combat mode, tracking targets other than the target of interest are not tracked and are also deleted from the MFD 290 (refer to FIG. 6), and only the target of interest may be displayed on the MFD 290. According to an embodiment, after switching is performed from the SWT-based mode 111 to the ACM-based mode 112 in the absence of a target of interest, target detection may be started in the ACM-based mode 112, and a first detected target may be tracked, designated as a target of interest, and displayed on the MFD 290. When a mode change is performed between the sub-operation modes (HUD scan, boresight, vertical scan, and slewable) of the ACM-based mode 112, a pilot's intension for finding a new target in a new search area may be reflected by deleting the target of interest and re-detecting targets. A new target may be found by the re-detecting, designated as a target of interest, and displayed on the MFD 290. When switching from ACM-based mode 112 to the SWT-based mode 111 (the NAST mode or the AAST mode), tracking of the target of interest may be maintained.

FIG. 7B is a conceptual diagram schematically illustrating a method of managing multiple targets when switching between the air-to-air single mode 110 and an interleaved mode 120 according to another embodiment.

Referring to FIG. 7B, switching may be performed from the air-to-air single mode 110 to the interleaved mode 120 for simultaneous operation in at least two modes among the air-to-air mode, the air-to-ground mode, the air-to-sea mode, and the imaging mode. In this case, target priorities may be respectively allocated to a plurality of targets based on tracking information on the targets and the preset priority rules, and as many targets as the preset maximum number of display targets may be set from the targets as situational awareness targets in order of highest to lowest of the target priorities of the targets. Then, only the situational awareness targets may be tracked.

In the interleaved mode 120, the fast beam steering capability of the AESA radar is used, and beams may be operated by allocating portions of the time resource of the AESA radar respectively to the air-to-air mode, the air-to-ground mode, the air-to-sea mode, and the imaging mode. The method of tracking multiple targets shown in FIG. 3 may be used in the air-to-air single mode 110. In the interleaved mode 120, when the air-to-air mode is used simultaneously with another mode such as the air-to-ground mode or the air-to-sea mode, the method of tracking multiple targets shown in FIG. 4 may be applied.

Referring to FIG. 7B, according to an embodiment, when switching from the air-to-air single mode 110 to the interleaved mode 120, all display targets including targets of interest and high-priority targets may be switched to situational awareness targets, and non-display targets may be deleted. For example, when there are targets of interest and high-priority targets in the interleaved mode 120, radar processing priorities of the targets of interest and the high-priority targets may increase, and thus, delay may occur in air-to-ground or air-to-sea missions. Thus, when switching is performed from the air-to-air single mode 110 to the interleaved mode 120, the targets of interest and the high-priority targets may be switched to situational awareness targets. According to another embodiment, when an engagement is required because a threatening target is identified in the air-to-air mode of the interleaved mode 120, switching to the SWT-based mode 111 of the air-to-air single mode 110 may occur by designating the threatening target as a target of interest or a high-priority target. When switching is performed from the interleaved mode 120 to the SWT-based mode 111, tracking of all situational awareness targets may be maintained. In another example, tracking of all situational awareness targets may be maintained even when switching is performed to the SWT-based mode 111 without designating a target of interest or high-priority target. When switching is performed from the interleaved mode 120 to the ACM-based mode 112 of the air-to-air single modes 110, all situational awareness targets that are being tracked in the air-to-air mode may be deleted. In this case, a target may be newly detected in the ACM-based mode 112, and the newly detected target may be automatically designated as a target of interest and displayed on the MFD 290.

FIG. 8 is a view illustrating shows the maximum numbers of targets according to types of targets managed in the air-to-air single mode and the interleaved mode.

Referring to FIG. 8, a maximum number $N_{DISP\_MAX}$ of display targets to be displayed on the MFD 290 (refer to FIG. 6) may be set in advance. The AESA radar 100 may determine the priorities of targets among trackable targets in real time and may display as many high-priority targets as the maximum number $N_{DISP\_MAX}$ of display targets on the MFD 290. Although targets other than the display targets are not displayed on the MFD 290, the AESA radar 100 may internally maintain tracking of the targets other than the display targets by allocating tracking beams respectively to the targets like the display targets and may acquire information on the distance, speed, and angle of each of the targets to determine the priorities of the targets. When the priorities of non-display targets are changed because of changes in information on the non-display targets such as the distances to the non-display targets or the speeds of the non-display targets, the processor 30 (refer to FIG. 2) may compare the priorities of the non-display targets in real time. When results of the comparing show that the priority of a non-display target is within the priorities of the maximum number $N_{DISP\_MAX}$ of display targets, the non-display target is switched to a display target, and among the display targets, a display target having a priority lower than the priority of the non-display target may be switched to a non-display target.

FIG. 8A is a view illustrating the maximum numbers of targets according to types of targets when switching between air-to-air modes according to an embodiment.

Referring to FIG. 8A, in the multi-target tracking method of the disclosure, the maximum number $N_{NODISP\_MAX}$ of non-display targets may be preset. For example, the maximum number $N_{NODISP\_MAX}$ of non-display targets may be set in advance to operate the AESA radar 100 with a portion of its total time resource remaining available. When the total number of targets being tracked by the AESA radar 100 reaches the sum of the maximum number $N_{DISP\_MAX}$ of display targets and the maximum number $N_{NODISP\_MAX}$ of non-display targets ($N_{DISP\_MAX}$+$N_{NODISP\_MAX}$), a target may be newly detected. The priority of the newly detected target may be compared with the priorities of targets that are currently being tracked. Then, the tracking of a target having the lowest priority among the targets that are currently being tracked may be stopped, and the newly detected target may be tracked.

As described above with reference to FIGS. 7A and 7B, the NAST mode and the AAST mode that are sub-modes of the SWT-based mode of the air-to-air single mode are modes for detecting and tracking a plurality of targets in all distance ranges within a maximum detection range. In the SWT-based mode, targets of interest TOI having the highest priority among the display targets may have a maximum number $N_{TOI\_MAX}$. For example, targets of interest TOI may be referred to as engaged targets, and there may be one target of interest TOI. Among the display targets, high-priority targets HPT having the next highest priority after the target of interest TOI may have a maximum number $N_{HPT\_MAX}$. For example, there may typically be four to six high-priority targets HPT. Among targets that are being tracked, as many targets as the maximum number of weapons mountable on a fighter jet may be designated as targets to be tracked with high accuracy for and engagement in combat. High-priority targets HPTs may be designated by a pilot, or the AESA radar 100 may automatically determine the maximum number $N_{HPT\_MAX}$ of high-priority targets HPT by target priority logic using target tracking information. The remaining display targets that are not designated as targets of interest TOI and high-priority targets HPT may be designated as situational awareness targets SAT. The priorities of the situational awareness targets SAT may be compared with the priorities of the non-display targets in real time, and the situational awareness targets SAT may be automatically switched to non-display targets. The maximum number of situational awareness targets SAT is $N_{DISP\_MAX}-(N_{TOI}+N_{HPT})$, where $N_{TOI}$ refers to the current number of currently designated targets of interest TOI, and $N_{HPT}$ refers to the current number of designated high-priority targets HPT.

The ACM-based mode of the air-to-air single mode is for close combat with a single target unlike the SWT-based mode that is for detecting and tracking multiple targets. In the ACM-based mode, searching may start in a given search area, and tracking of a first detected target may start. When tracking of a target starts, the target may be automatically designated as a target of interest TOI and displayed on the MFD 290 without pilot intervention for quickly preparing an engagement. In the ACM-based mode, however, the automatically designated target of interest TOI may not be a target of interest to the pilot. Thus, a new target may be detected and tracked, and to this end, a maximum of one non-display target may be internally tracked in the ACM-based mode. When the pilot dismisses the current target of interest TOI, the non-display target that is being internally tracked may be switched to a target of interest TOI without spending time to detect and track a new target and may be displayed on the MFD 290. Thereafter, the AESA radar 100 may continue searching until the AESA radar 100 detects one new non-display target and may stop searching when detecting one new non-display target.

FIG. 8B is a view illustrating the maximum numbers of targets according to types of targets in the air-to-air mode of the interleaved mode according to another embodiment. Referring to FIG. 8B, in the air-to-air mode of the interleaved mode, only as many situational awareness targets HPT as the maximum number $N_{DISP\_MAX}$ of display targets may be displayed. The interleaved mode is operationally intended to promote air-to-air situational awareness during air-to-ground/sea missions. For example, when there is a target having high priority (for example, a target of interest TOI or a high-priority target HPT) in terms of air-to-air engagement in the air-to-air mode in a situation in which air-to-ground/sea engagement is the main interest of a pilot, the priority of radar beam processing increases for the target or interest TOI or the high-priority target HPT, and thus, delay may occur in air-to-ground/sear missions. In the air-to-air mode of the interleaved mode, tracking resources may not be allocated to targets for engagement, such as targets of interest TOI, high-priority targets HPT, and non-display targets, to increase the priority of air-to-ground missions.

FIG. 9A is a view illustrating, by example, the dwell times of radar's search beams, the dwell times of radar's tracking beams, and tracking frequencies for display targets and non-display targets with respect to radar-to-target distances, according to an embodiment.

The AESA radar 100 may allocate tracking beams to targets in an adaptive and differential manner based on the priorities of the targets and tracking information on the targets (for example, the distances between the targets and the AESA radar 100, the approach speeds of the targets toward the AESA radar 100, the angles of the targets from the center of the AESA radar 100, or the like). In general, for adaptive operation of tracking beams of the AESA radar 100, the dwell times and tracking periods of tracking beams may be differentiated according to distances by considering a signal to noise ratio (SNR) and a tracking accuracy level that are required at each distance. FIG. 9A illustrates, by example, the dwell times and tracking frequencies of tracking beams according to the types of targets and the distances from the AESA radar 100 to targets. Referring to FIG. 9A, it may be seen that the closer the distance between a target and the AESA radar 100, the shorter the dwell time of a tracking beam, and the greater the tracking frequency, the shorter the tracking period.

FIG. 9B illustrates, by example, the maximum numbers of trackable targets with respect to radar-to-target distances, according to an embodiment.

FIG. 9B shows an example of calculating the maximum number of targets that may be tracked according to distance by using the data shown in FIG. 9A on the premise that when tracking beams are allocated to all tracking targets, the tracking beams are allocated for each tracking without delay according to a desired tracking period. FIG. 9B illustrates, by example, the number of display targets and the number of non-display targets when targets are at each distance scale section in a condition in which the maximum number $N_{DISP\_MAX}$ of display tracking targets is set to be 20 and the maximum number $N_{NODISP\_MAX}$ of non-display tracking targets is set to be 200. Referring to FIG. 9B, when all targets are at a distance of 25 NM or more from the AESA radar 100, the maximum number of targets that may be tracked by considering the load on the AESA radar 100 is 18 and does not exceed the maximum number $N_{DISP\_MAX}$ of display tracking targets (20 targets), and thus, all the tracked targets may be displayed on the MFD 290. However, when all targets are within a short distance of less than 25 NM from the AESA radar 100, as many targets as the maximum number $N_{DISP\_MAX}$ of display tracking targets (20 targets) may be displayed on the MFD 290, and the other targets may be managed as non-display targets. The priorities of the non-display targets may be compared in real time with the priorities of the display targets for switching between the display targets and the non-display targets.

According to the one or more of the above embodiments, in the method of tracking multiple targets using an AESA radar, the priorities of a plurality of targets are determined in real time by priority rules based on tracking information on the targets in air-to-air mode, and the targets are classified according to the priorities of the targets and the tracking accuracy levels of the targets. Therefore, tracking beams may be processed without delay for targets having high priority. In addition, the number of tracking targets is limited to prevent waste of radar resources by continuously repeating the processes of detecting targets, initiating tracking of the targets, and deleting the targets as long as the targets are within the detection range or search area of the AESA radar, and tracking of multiple targets is efficiently managed, thereby allowing pilots to carry out missions more conveniently and ultimately improving the performance of the AESA radar and the efficiency of fighter jet operations.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of tracking multiple targets using an active electronically scanned array (AESA) radar, the method being performed by at least one computing device and comprising:

acquiring tracking information on each of the multiple targets, the tracking information comprising a tracking mode;

allocating a target priority to each of the multiple targets based on the tracking information on each of the multiple targets and preset priority rules;

extracting, based on the target priorities of the multiple targets, a plurality of tracking targets having a first tracking mode as the tracking mode from the multiple targets;

extracting a plurality of tracking candidate targets having a second tracking mode as the tracking mode from the multiple targets excluding the plurality of tracking targets;

setting a plurality of display targets by selecting as many targets as a preset maximum number of display targets from the plurality of tracking targets in order of highest to lowest of the target priorities of the plurality of tracking targets, and setting non-display targets by selecting the plurality of tracking targets excluding the plurality of display targets; and tracking the plurality of display targets, wherein the acquiring of the tracking information on each of the multiple targets comprises, when the tracking information on at least one target among the multiple targets changes, changing the tracking mode for each of the multiple targets based on the target priority of each of the multiple targets, a distance from the AESA radar to each of the multiple targets, and a preset maximum display range.

2. The method of claim 1, wherein the tracking information on at least one target among the plurality of targets comprises angle information comprising an azimuth angle and an elevation angle of the at least one target according to a location of the at least one target, a tracking mode for the at least one the target, a distance from the at least one target to the AESA radar, engagement information on the at least one target, and a target priority of the at least one target.

3. The method of claim 2, wherein the allocating of the target priority to each of the multiple targets comprises:

setting targets engaged in combat with the AESA radar from among the plurality of tracking targets as targets of interest and respectively allocating target priorities to the targets of interest in order of engagement start times of the targets of interest from most recent to oldest;

setting, as high-priority targets, targets in a standby mode for engagement with the AESA radar from among the plurality of tracking targets excluding the targets of interest, and respectively allocating target priorities to the high-priority targets based on the preset priority rules;

setting, as situational awareness targets, targets in a non-combat mode with the AESA radar from among the plurality of display targets excluding the targets of interest and the high-priority targets, and respectively allocating target priorities to the situational awareness targets based on the preset priority rules; and allocating, based on the preset priority rules, target priorities to the non-display targets, respectively, among the plurality of tracking targets.

4. The method of claim 3, further comprising comparing the target priorities of the situational awareness targets and the target priorities of the non-display targets with each other, wherein, when the target priority of a first non-display target among the non-display targets is higher than the target priority of a first situational awareness target among the situational awareness targets, the first non-display target is switched to a situational awareness target, and the first situation awareness target is switched to a non-display target.

5. The method of claim 1, wherein, when a number of the plurality of tracking targets is equal to a total of the preset maximum number of display targets and a preset maximum number of non-display targets, the method further comprises detecting at least one tracking candidate target as a first tracking candidate target from among the plurality of tracking candidate targets.

6. The method of claim 5, wherein the detecting of the at least tracking candidate target as the first tracking candidate target from among the plurality of tracking candidate targets comprises:

acquiring tracking information on the first tracking candidate target; and when a distance from the AESA radar to the first tracking candidate target is greater than or equal to the preset maximum display range, and the target priority of the first tracking candidate target is higher than a lowest target priority among the target priorities of the plurality of display targets, changing the tracking mode of the first tracking candidate target to the first tracking mode and switching the first tracking candidate target to a situational awareness target.

7. The method of claim 6, wherein the acquiring of tracking information on the first tracking candidate target comprises, when the distance from the AESA radar to the first tracking candidate target is greater than or equal to the preset maximum display range, and the target priority of the first tracking candidate target is lower than the lowest target priority among the target priorities of the plurality of display targets, determining whether the first tracking candidate target is within a preset search area.

8. The method of claim 7, wherein the determining of whether the first tracking candidate target is within the preset search area comprises:

determining whether an azimuth angle and an elevation angle of the first tracking candidate target are respectively within an azimuth angle range and an elevation angle range of the preset search area, when the first tracking candidate target is within the preset search area, changing a tracking mode for the first tracking candidate target to the first tracking mode and switching the first tracking candidate target to the non-display target; and when the first tracking candidate target is not within the preset search area, setting the second tracking mode as the tracking mode for the first tracking candidate target.

9. The method of claim 1, wherein the target priorities are calculated according to the preset priority rules based on an elevation of each of the multiple targets according to a location of each of the multiple targets, an angle of each of the multiple targets from a center of the AESA radar, a distance to each of the multiple targets from the AESA radar, and an approach speed of each of the multiple targets toward the AESA radar.

10. The method of claim 3, wherein when the AESA radar is in a close combat mode for the multiple targets, the targets of interest are set as the plurality of display targets, and the plurality of tracking targets excluding the targets of interest are switched to the plurality of tracking candidate targets having the second tracking mode.

11. A computer program stored in a medium to execute, by using a computing device, the method of claim 1.

12. A system for tracking multiple targets, the system comprising an active electronically scanned array (AESA) radar and a target management unit configured to manage the multiple targets, wherein the target management unit comprises:

a tracking information acquisition unit configured to acquire tracking information on each of the multiple targets, the tracking information comprising a tracking mode for each of the multiple targets;

a priority allocation unit configured to allocate a target priority to each of the multiple targets based on the tracking information on each of the multiple targets and preset priority rules;

a tracking target extraction unit configured to extract a plurality of tracking targets having a first tracking mode from the multiple targets based on the target priorities;

a display target setting unit configured to set a plurality of display targets by selecting as many tracking targets as a preset maximum number of display targets from among the plurality of tracking targets in order of highest to lowest of the target priorities; and a target tracking unit configured to track the plurality of display targets, wherein the tracking information acquisition unit is further configured to, when tracking information on at least one target among the multiple targets changes, change the tracking mode for each of the multiple targets based on the target priority of each of the multiple targets, a distance from the AESA radar to each of the multiple targets, and a preset maximum display range.

13. The system of claim 12, wherein the target management unit further comprises:

a tracking candidate extraction unit configured to extract a plurality of tracking candidate targets having a second tracking mode from among the multiple targets excluding the plurality of tracking targets;

a non-display target setting unit configured to set each of the plurality of tracking targets excluding the plurality of display targets as a non-display target; and a target output unit configured to output results of tracking the plurality of display targets using the target tracking unit.

14. The system of claim 13, wherein the target management unit further comprises a target detection unit configured to detect at least one tracking candidate target among the plurality of tracking candidate targets when a number of the plurality of tracking targets is equal to a total of the preset maximum number of display targets and a preset maximum number of non-display targets.

* * * * *